United States Patent [19]

Grotenhofer

[11] Patent Number: 5,076,729
[45] Date of Patent: Dec. 31, 1991

[54] TUNNEL-DRIVING AND SUPPORT SYSTEM

[75] Inventor: Heinrich Grotenhofer, Krefeld, Fed. Rep. of Germany

[73] Assignee: Gebr. Eichoff Maschinenfabrik, Bochum, Fed. Rep. of Germany

[21] Appl. No.: 542,011

[22] Filed: Jun. 22, 1990

[30] Foreign Application Priority Data

Jul. 4, 1989 [DE] Fed. Rep. of Germany ....... 3921920

[51] Int. Cl.$^5$ ............................................ E21D 11/14
[52] U.S. Cl. .................................... 405/146; 299/31; 405/138
[58] Field of Search ............... 405/138, 141, 146, 150; 299/31, 33; 29/237; 138/122, 172

[56] References Cited

U.S. PATENT DOCUMENTS

| | | | |
|---|---|---|---|
| 2,996,085 | 8/1961 | Matheny | 405/150 X |
| 3,334,945 | 8/1967 | Bartlett | 405/144 X |
| 3,508,317 | 4/1970 | Hill et al. | 405/150 |
| 3,603,100 | 9/1971 | Cowley | 405/150 X |
| 3,830,545 | 8/1974 | Sugden | 405/144 X |
| 3,972,200 | 8/1976 | Scarpi | 405/150 X |

FOREIGN PATENT DOCUMENTS 2442357 4/1975 Fed. Rep. of Germany .

Primary Examiner—Dennis L. Taylor
Attorney, Agent, or Firm—Clifford A. Poff

[57] ABSTRACT

A tunnel support machine for use in a tunnel forming system wherein the tunnel support machine follows a tunnel-driving machine during the driving operation. Through the operation of the tunnel support machine, a preferably inaccessible tunnel cavity formed by the tunnel-driving machine is supported by a profiled ribbon which is continuously fed to the tunnel support machine and continuously spirally wound thereby into a support tube which lines and reinforces the tunnel cavity. Supply and discharge lines extending rearwardly from the tunnel-driving machine generally in the central area of the tunnel cavity connect to longitudinally extending bores provided in a stationary cylindrical part of a rotary bushing of the tunnel support machine. The longitudinal bores in the cylindrical part of the rotary bushing in turn are in communication with longitudinal bores provided in the body of a stationary outer tube of the rotary bushing which are connected to rearwardly directed lines that rest on the support tube floor and extend outwardly of the wound profiled ribbon support tube to a source location.

19 Claims, 2 Drawing Sheets

TUNNEL-DRIVING AND SUPPORT SYSTEM

BACKGROUND OF THE INVENTION

1. Field of the Invention

The present invention generally relates to tunnel-driving and support systems and, in particular, to a tunnel support machine for use in a tunnel forming system wherein the tunnel support machine follows a tunnel-driving machine during the driving operation. More particularly, through the operation of the present invention, an inaccessible and/or lengthy tunnel cavity formed by the tunnel-driving machine is supported by a profiled ribbon which is continuously fed to the tunnel support machine and continuously spirally wound thereby into a support tube which lines and reinforces the tunnel cavity, the individual windings of the ribbon being connected together in the area of the side edges of the ribbon, as by jamming, and pressed against the wall of the tunnel.

2. Description of the Prior Art

German Offenlegungsschrift DE OS 24 42 357 discloses a system wherein the walls of a tunnel which is formed with a driving machine are lined during the driving operation with a helical coil formed from a flexible ribbon wound by a tunnel support machine. In this system, the removal of material detached or excavated by the tunnel-driving machine occurs by means of a conveying device installed in the area of the central axis of the tunnel and the helical lining. In operation, the wound ribbon must be continuously pushed as a spiral over the conveying device, and in some cases the required supply and discharge lines. In such a system, the profiled ribbon, which is stored on rolls, can only be suspended on the driving machine and on the entrance shaft. For this reason, only relatively short tunnel-driving lengths can be obtained. Since this system provides that the profiled ribbon be wound onto rolls and stored, it has proven to be impractical for providing support for inaccessible and/or lengthy tunnels because only a small number of coils can be carried by the tunnel driving machine and the separating operation involving rewinding a new supply of profiled ribbon onto the coils occurs too frequently.

Consequently, an advantage exists for a tunnel support machine which can receive a continuous supply of the profiled ribbon and can continuously spirally wind the profile over support drifts of any length without interruption. A further advantage exists for a tunnel support machine which enables the supply and discharge lines extending rearwardly from the system in the region of the central axis of the tunnel tube to be laid upon the floor of the tube rearwardly of the tunnel support machine whereby they may extend to a source location outside of the spirally wound tube without need of a support which would interfere with the continuous feeding-in of the profiled ribbon.

It is, therefore, an object of the present invention to provide a tunnel support machine which can receive a continuous supply of profiled ribbon and can continuously spirally wind the profile over support drifts of any length without interruption.

It is a further object of the present invention to provide a tunnel support machine which enables the supply and discharge lines extending rearwardly from the system in the region of the central axis of the tube to be laid upon the floor of the tube rearwardly of the tunnel support machine whereby they may extend to a source location outside of the spirally wound tube without need of a support which would interfere with the continuous feeding-in of the profiled ribbon. 10 Still other objects and advantages of the present invention will become apparent in light of the attached drawings and written description of the invention presented hereinbelow.

SUMMARY OF THE PRESENT INVENTION

In accordance with the present invention, the supply and discharge lines for the tunnel driving machine, which are typically led rearwardly in the central axis area of tunnel tube, connect to first longitudinal bores provided in a stationary cylindrical inner part of a rotary bushing of the tunnel support machine which communicate with second longitudinal bores formed in a jacket of a stationary outer tube of the rotary bushing which, in turn, are connected to lines laid on the floor of the support tube radially outwardly of the feed path of the profiled ribbon.

The invention furthermore provides that the rotary bushing be comprised of a rotatable double-walled tube which is spaced from and encloses the stationary cylindrical inner part whereby annular spaces which are sealed from each other are formed between the stationary inner part and the rotatable double-walled tube. The stationary outer tube is spaced from and encloses the rotatable double-walled tube whereby annular ducts which are sealed from each other are formed between the rotatable double-walled tube an the stationary outer tube. Each of the second longitudinal bores formed in the jacket or body of the outer tube and connected to the supply and discharge lines laid on the support tube floor which run rearwardly (as viewed in the tunnel-driving direction) communicate via radial bores with a respective one of the annular ducts. At the same time, each of the annular ducts is in communication via radial passages with one of the annular spaces. Each of the annular spaces, meanwhile, communicates with the respective one of the first longitudinal bores formed in the stationary cylindrical inner part, and hence with one of the lines emanating from the tunnel-driving machine. And, sealing between the stationary parts and the rotating part is advantageously achieved with sliding seals.

According to another feature of the invention, the rotatable double-walled tube contains helical passageways for guiding the spirally running profiled ribbon, the passageways being formed from helical flights or stays which are situated in the annular space between the two walls of the tube. The invention also provides that the transmission of the electrical energy and the control and measuring signals from the lines laid on the floor of the support tube to the lines running in the area of the central axis of the tunnel may occur either wirelessly via emitters and receivers or via slip rings and sliding contacts which may be alternatively fixed to the rotating or stationary parts of the rotary bushing.

According to a further feature of the invention, the profiled ribbon is transported forwardly by the rotation of the double-walled tube provided with the helical flight in conjunction with a driven feed roll fixed to the double-walled tube and a counter-roll. The ribbon is conveyed to a jointing point at which it is joined together over a pressure roll and pressed against a plate-end seal which butts against the wall of the tunnel so that the penetration of water into the support tube is prevented. The driving of the feed roll can occur by an individual drive means or by a pinion rotating on a gear rim which is connected to a stationary end plate of the tunnel support machine.

In order to prevent the outer tube from rotating during the rotation of the double-walled tube, the invention provides that the pinion for driving the feed roll also be connected via a shaft to a further pinion which engages in a gear rim connected to the jacket of the outer tube of the rotary bushing.

DESCRIPTION OF THE PREFERRED EMBODIMENT

Figure 1:
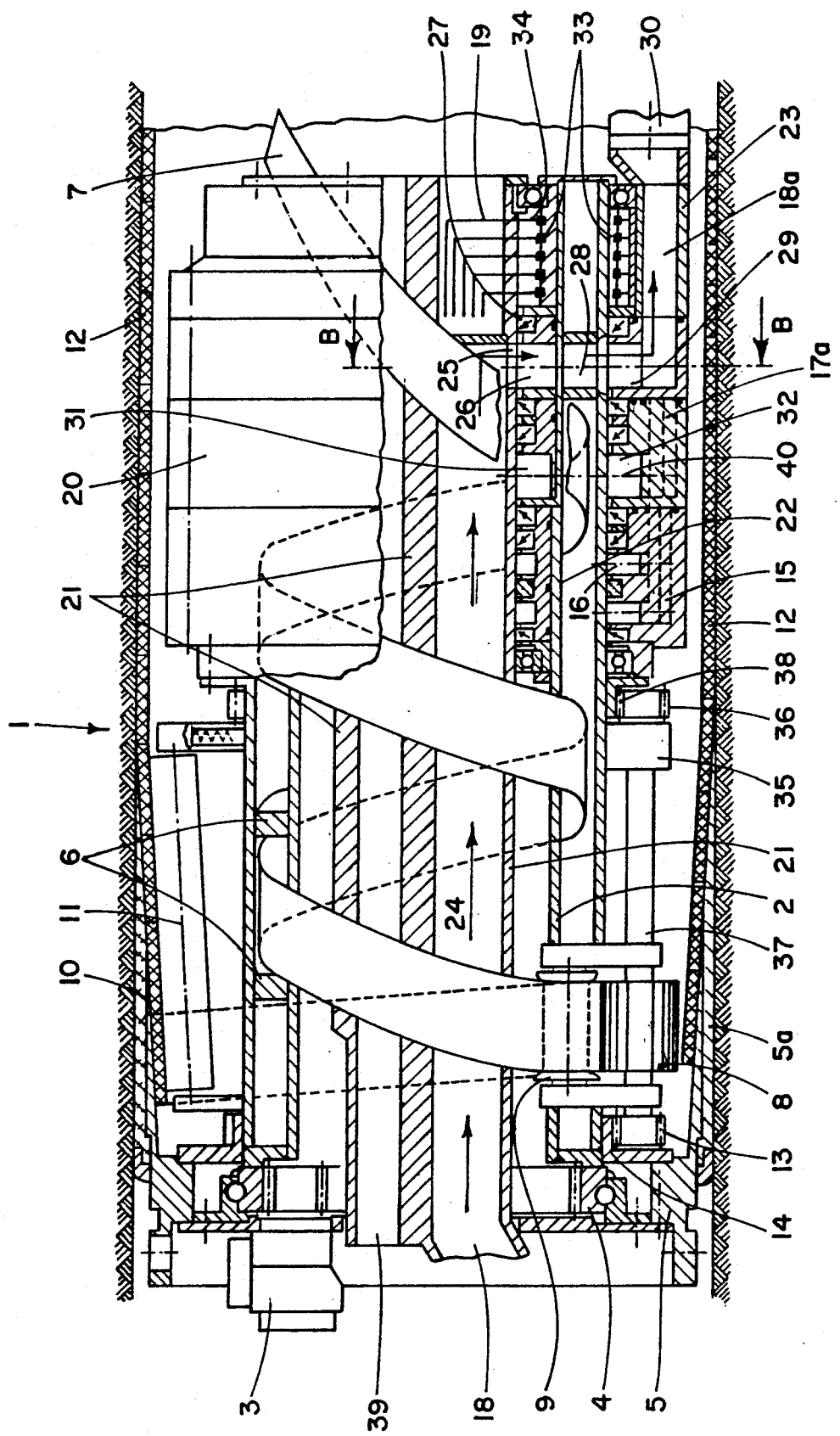
FIG. 1 is a longitudinal section in elevation through the tunnel support machine of the present invention.

In FIG. 1 there is shown a tunnel support machine 1 constructed in accordance with the present invention which may follow a tunnel-driving machine (not illustrated) in a tunnel forming operation. The details of the tunnel-driving machine do not form a part of the present invention, hence they will not be further elaborated upon since the general structure and operation of such a machine are well known by one skilled in the art.

The tunnel support machine 1 is comprised of a rotatable double-walled tube 2 which is mounted in a bearing 4 carried in a stationary end plate construction 5. The double-walled tube 2 is caused to rotate by means of a drive means 3 which turns a pinion 3a that turns a gear rim 4a fixedly attached to the double-walled tube. A profiled ribbon 7 serving to form a spirally wound support tube for support and reinforcement of the tunnel is continuously led through a helical passageway formed by spaced apart helical flights or stays 6 which are arranged in the hollow space between the inner and outer walls of double walled tube 2. The forward movement of the profiled ribbon 7 in the tunnel support machine occurs by the rotation of the double-walled tube 2 in conjunction with the rotation of a driven feed roll 8 and a counter-roll 9 which are fastened to the tube 2. Upon passing between feed roll 8 and counter-roll 9, the ribbon is conveyed to a jointing point 10, at which it is joined together over a pressure roll 11, so that an endless spirally wound support tube 12 is formed. The joining-together of the ribbon 7 can, for example, occur by the mechanical pressing into one another of a groove and spring connection, which is provided on the longitudinal edges of the profiled ribbon. The driving of the feed roll 8 may be effected either by an individual motor (not shown) or, as in the preferred illustrated embodiment, by a pinion 13 which is drivingly connected to the feed roll by a shaft and which rolls along a stationary gear rim 14 connected to the end plate construction 5.

The first windings of the profiled ribbon 7, through cooperation of the feed roll 8 and the pressure roll 11, are pressed against a conically shaped interior circumferential wall surface provided on each of the end plate construction 5 and a plate-end seal 5a which runs conically in extension of the end plate construction so that penetration of water into the tunnel support machine is prevented. The profiled ribbon is then joined along its longitudinal edges and butts tightly as a support tube 12 against the wall of the tunnel at the downstream end of the plate-end seal 5a.

The supply and discharge of the tunnel-driving and support device takes place via a number of lines, e.g., oil inflow and outflow lines 15 and 16, an inflow line 17 with an appropriate outflow line 18 for the hydraulic conveyance of the drilled material excavated by the tunnel-driving machine, and further lines for fresh water and compressed air which may be required in certain cases. Electrical current cables 19 and lines for the transmission of control and measuring signals are also required if their transmission does not occur wirelessly.

The supply and discharge lines emanating from the tunnel-driving machine in the area of the central axis of the tunnel are led, according to the present invention, via a rotary bushing into a radially outer area of the tunnel tube 12, preferably the floor area, so that they can be led further rearwardly, as viewed in the tube forming direction, to a source location outside the spirally wound profiled ribbon. These supply and discharge lines permit transmission of electrical energy and control and measuring signals from the supply and discharge lines projecting rearwardly of the tunnel support machine to the supply and discharge lines of the tunnel-driving machine. The rotary bushing, herein designated by numeral 20, is composed of a stationary inner part 21, a rotating center part 22, which is essentially an extension of the double-walled tube 2, and a stationary tubular outer part 23 enclosing the double-walled tube 22 with annular ducts (e.g., 29 and 32) being formed therebetween.

Figure 2:
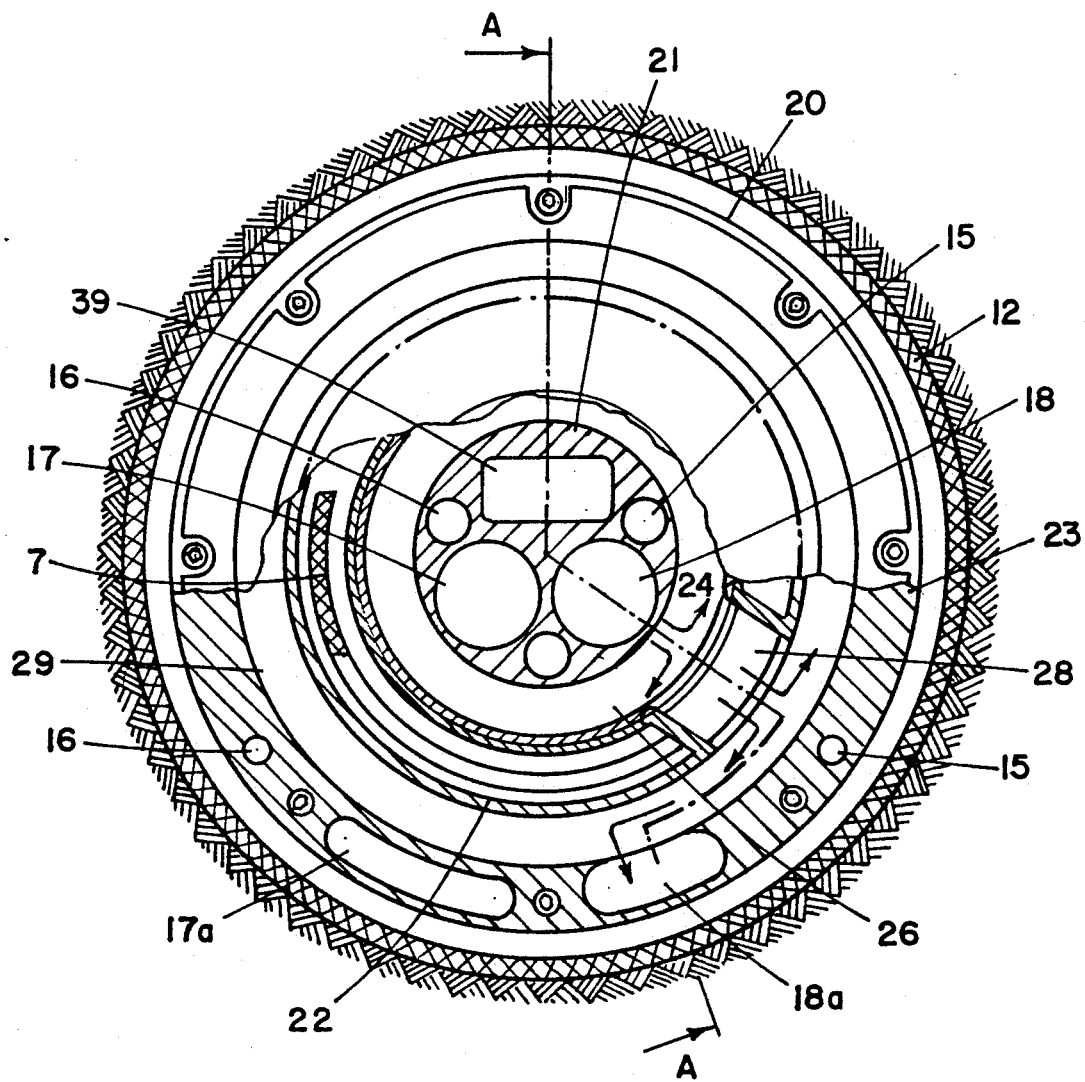
FIG. 2 is a cross-section taken along line B—B of FIG. 1 of the rear area of the rotary bushing of the tunnel support machine of the present invention.

The mode of operation of the rotary bushing 20, which is a dual rotary bushing, is evident from FIGS. 1 and 2 and is explained in conjunction with the longitudinal bore or line 18. Line 18, as noted hereinabove, is a hydraulic fluid outflow line via which the drilled material from the tunnel-driving machine is conveyed rearwardly by the rotary bushing 20. The water laden with solid material enters the longitudinal bore 18 of the stationary inner part 21 of the rotary busing 20 in the direction of the arrow 24 and passes through an opening 25 into an annular space 26, which is formed between the stationary inner part 21 and the inner wall of the rotatable double-walled tube 22. The annular space 26, as well as all other so-formed annular spaces, is laterally sealed by sliding seals, which are herein designated by numeral 27. From the annular chamber 26 the water passes via radial passages 28, only one of which are shown, provided in the double wall of the tube 22 into an annular duct 29 which is one of the annular ducts provided in the space between the double-walled tube 22 and the jacket of the stationary outer tube 23. Like the annular spaces provided between the stationary inner part 21 and the rotatable double-walled tube 22, the annular ducts provided between the double-walled tube and the stationary outer tube 23 are laterally sealed by sliding seals. The rotatable tube 22 forming the center part of the rotary bushing likewise contains spaced-apart helical flights or stays 6 for guiding the profiled ribbon 7. As will be appreciated, the radial flow passages 28 are therefore arranged at locations which avoid the helical ribbon-guiding passageway formed by the stays 6.

The body of the stationary outer part 23 is provided with bores which extend in longitudinal direction of the tunnel support machine. The bore into which the water passes from the annular duct 29 is designated by 18a and it is connected to a corresponding discharge line of the supply and discharge lines 30 which extend to a source location outside of the spirally wound tube.

The water supply to the tunnel-driving machine occurs via the forward or inflow lines (17a and 17) in reverse order to the water discharge arrangement described hereabove. In particular, the inflow line 17 runs parallel to the outflow line 18, as can be recognized in FIG. 2. The hydraulic inflow lines 17 and 17a communicate via annular space 31 and annular duct 32 which are joined by unillustrated radial flow passages, similar to flow passages 29, provided in rotatable tube 22.

The annular space 31, the annular duct 32, the radial flow passages in rotatable center part 22, and the pass-through openings, similar to opening 25, in the inner part 21 and in the outer part 23 of the rotary bushing 20 reside in the plane indicated by the line 40 in FIG. 1, and for this reason they cannot be seen in FIG. 2. Essentially the same flow arrangement applies to the oil inflow and discharge lines (15 and 16.)

The connection of the electrical lines for the transmission of the electrical energy and the control and measuring signals occurs in the rotary bushing 20 by slip rings 33. The slip rings 33 and sliding contacts may be alternatively fastened relative to one another to either rotating center part 22 or the stationary parts. As will be appreciated, attachment of the electrical connection components to the center part 22 must be at locations not interfered by the helical passageway for guiding the profiled ribbon. Furthermore, in the stationary inner part 21 of the rotary bushing there can be formed a continuous duct 39, which can be used, by means of emitters and receivers, for the wireless transmission of measuring or control signals and also for the passage of laser beams for controlling the tunnel-driving machine.

The outer part 23 of the rotary bushing 20, because of some degree of unavoidable friction occurring by the sliding action of the seals 27, attempts to rotate at the same time as the rotatable double-walled tube 2 and center part 22. As the support machine 1 operates, a direct support of the outer part 23 by or against the stationary end plate construction 5 is impossible. According to the present invention, in order to prevent the outer part 23 from rotating at the same time as the center part 22, a counter-running device 35 is used. Although it may be driven by a separate and independent drive means, the counter-running device 35, like the feed roll 8, is preferably driven via the rotation of the pinion 13 along the gear rim 14 fastened to the end plate construction 5. In particular, the pinion 13 is preferably drivingly connected via a shaft 37 to a further pinion 36 which engages in a gear rim 38 attached to outer part 23 of rotary busing 20. With appropriate reduction, the outer part 23 of the rotary bushing 20 is thus held in its stationary resting position and not rotated at the same time as the center part 22.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. In a tunnel forming system wherein a tunnel support machine follows a tunnel-driving machine having supply and discharge lines projecting rearwardly therefrom generally in the central area of the tunnel, said tunnel support machine comprising:

means for continuously feeding a profiled ribbon and for continuously winding said profiled ribbon into a spirally wound support tube for supporting and reinforcing a tunnel created by the tunnel-driving machine; and bushing means for connecting the supply and discharge lines of the tunnel-driving machine to supply and discharge lines projecting rearwardly of the tunnel support machine and extending along a radially outer internal region of the support tube to a source location outside the support tube.

2. The tunnel support machine of claim 1 wherein said bushing means for connecting the supply and discharge lines of the tunnel-driving machine to the supply and discharge lines projecting rearwardly of the tunnel support machine comprise a rotary bushing.

3. The tunnel support machine of claim 2 wherein said rotary bushing includes a stationary inner part having first longitudinal bores in fluid communication with the supply and discharge lines projecting rearwardly of the tunnel-driving machine and a stationary outer tube arranged radially outwardly of said inner part, said stationary outer tube having second longitudinal bores in fluid communication with said first longitudinal bores and with the supply and discharge lines projecting rearwardly of the tunnel support machine.

4. The tunnel support machine of claim 3 wherein said rotary bushing further includes a rotatable double-walled tube spaced from and enclosing said stationary inner part with annular spaces isolated from one another by seals being formed therebetween; said stationary outer tube being spaced from and enclosing said rotatable double-walled tube with annular ducts isolated from one another by seals being formed therebetween; each respective one of said supply and discharge lines projecting rearwardly of the tunnel-driving machine communicating with a respective one of said first longitudinal bores, each respective one of said first longitudinal bores communicating via a radial bore in said stationary inner part with a respective one of said annular spaces, each respective one of said annular spaces communicating with a respective one of said annular ducts via radial passages in said rotatable double-walled tube, each of said annular ducts communicating via a radial passage in said stationary outer part with a respective one of said second longitudinal bores, and each of said second longitudinal bores communicating with a respective one of the supply and discharge lines projecting rearwardly of the tunnel support machine.

5. The tunnel support machine of claim 4 wherein the seals between said rotatable double-walled tube and each of said stationary inner part and said stationary outer tube comprise sliding seals.

6. The tunnel support machine of claim 1 further comprising means for permitting transmission of electrical energy and control and measuring signals from the supply and discharge lines projecting rearwardly of the tunnel support machine to the supply and discharge lines of the tunnel-driving machine.

7. The tunnel support machine of claim 6 wherein said means for permitting transmission of electrical energy and control and measuring signals comprise a continuous duct formed in said stationary inner part for enabling wireless transmission of electrical energy and control and measuring signals.

8. The tunnel support machine of claim 4 further comprising means for permitting transmission of electrical energy and control and measuring signals from the supply and discharge lines projecting rearwardly of the tunnel support machine to the supply and discharge lines of the tunnel-driving machine.

9. The tunnel support machine of claim 8 wherein said means for permitting transmission of electrical energy and control and measuring signals comprise slip rings and sliding contacts each of which are alternatively fixable relative to the other on either said double-walled tube or the stationary parts of said rotary bushing.

10. The tunnel support machine of claim 1 wherein said means for continuously feeding and winding said profiled ribbon comprise a rotatable double-walled tube containing a helical passageway for guiding said profiled ribbon into a spiralled configuration, said helical passageway being formed from helical flights arranged in a hollow space between the two walls of said double-walled tube.

11. The tunnel support machine of claim 10 wherein said means for continuously feeding and winding said profiled ribbon further comprise a feed roll fixed to said double-walled tube and a counter-roll, whereby rotation of said double-walled tube in conjunction with rotation of said feed roll and said counter-roll convey said profiled ribbon forwardly.

12. The tunnel support machine of claim 11 further comprising means carried by said tunnel support machine for joining individual windings of said spirally wound support tube together along longitudinal side edges thereof.

13. The tunnel support machine of claim 12 wherein said means for joining comprise a pressure roll carried by said double-walled tube and stationary end plate structure having an interior conical surface, the individual windings being jammingly joined together along their longitudinal side edges over said pressure roll, said pressure roll further acting to press the joined windings firstly against said conical surface and thereafter against the wall of the tunnel during rotation of said double-walled tube.

14. The tunnel support machine of claim 11 further comprising means for driving said feed roll.

15. The tunnel support machine of claim 13 further comprising means for driving said feel roll.

16. The tunnel support machine of claim 15 wherein said means for driving said feed roll comprises a first gear rim fixed to said stationary end plate structure, a first pinion rotatable along said first gear rim, and a shaft connected to said first pinion and said feed roll for driving said feed roll by the rotation of said first pinion.

17. The tunnel support machine of claim 16 further comprising an outer tube spaced from and enclosing said rotatable double-walled tube, bearings supporting said outer tube about said double-walled tube, and means for preventing rotation of said outer tube relative to said double-walled tube.

18. The tunnel support machine of claim 17 wherein said means for preventing rotation comprise a second pinion connected to and driven by said shaft, said second pinion engaging a second gear rim fixed to said outer tube.

19. The tunnel support machine of claim 4 wherein said second longitudinal bores are provided in a body portion of said stationary outer tube located adjacent the floor of said spirally wound support tube whereby the supply and discharge lines projecting rearwardly of the tunnel support machine can be laid unsupported on the floor of said spirally wound tube and out of the path the continuously fed profiled ribbon.

* * * * *